(12) United States Patent
Fay

(10) Patent No.: US 7,672,967 B2
(45) Date of Patent: Mar. 2, 2010

(54) METHOD AND SYSTEM FOR OBFUSCATING DATA STRUCTURES BY DETERMINISTIC NATURAL DATA SUBSTITUTION

(75) Inventor: Jonathan E. Fay, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 11/052,241

(22) Filed: Feb. 7, 2005

(65) Prior Publication Data
US 2006/0179075 A1 Aug. 10, 2006

(51) Int. Cl.
*G06F 17/00* (2006.01)
(52) U.S. Cl. .................. 707/102; 707/100; 707/101
(58) Field of Classification Search .......... 707/100–102
See application file for complete search history.

(56) References Cited

U.S. PATENT DOCUMENTS 6,011,849 A * 1/2000 Orrin ..................... 380/42
2003/0208457 A1 11/2003 Iyengar
2006/0082592 A1 * 4/2006 Black-Ziegelbein et al. . 345/605
2007/0014428 A1 * 1/2007 Kountchev et al. .......... 382/100

FOREIGN PATENT DOCUMENTS

EP 1637955 A 3/2006
WO WO03021473 A 3/2003

OTHER PUBLICATIONS

"Strategies to Improve Application Testing," Retrieved from the Internet, Jun. 16, 2006, www.princetonsoftech.com.
Steven P Reiss, "Practical Data-Swapping: The First Steps," ACM Transactions on Database Systems, Mar. 1, 1984, pp. 20-37, vol. 9, No. 1, New York, NY.

* cited by examiner

*Primary Examiner*—Sana Al-Hashemi
(74) *Attorney, Agent, or Firm*—Shook Hardy & Bacon LLP

(57) ABSTRACT

A method and system create a data structure from an obfuscated data structure. First, the system operates on a first data structure whose obfuscation is desired, and creates a data string based on a portion of the first data structure. Next, based on the data string, a second data structure is deterministically generated from a third data structure and the second data structure replaces the first data structure.

10 Claims, 8 Drawing Sheets

| | 410 | 412 | 414 | 416 | 418 | 420 |
|---|---|---|---|---|---|---|
| 400 | ID | FIRST NAME | LAST NAME | COMPANY | GENDER | PHONE NUMBER |
| 422 | 0001 | CHRIS | JOHNSON | ZYX CO. | M | (913)456-1234 |
| 424 | 0002 | JENNY | JOHNSTON | ACME, INC. | F | (707)897-0456 |
| 426 | 0003 | SUZANNE | MEYERS | 2MEN, INC. | F | (212)421-9876 |
| | . | . | . | . | . | . |
| | . | . | . | . | . | . |
| | . | . | . | . | . | . |
| 428 | 1434 | SEAN | OSBORNE | MUSIC, INC. | M | (214)798-4550 |
| 430 | 1435 | JULIO | GONZOLEZ | MOVE, INC. | M | (314)528-4683 |

| | 610 | 612 | 614 | 616 | 618 | 620 |
|---|---|---|---|---|---|---|
| 600 | ID | FIRST NAME | LAST NAME | COMPANY | GENDER | PHONE NUMBER |
| 622 | 0001 | BRAD | JONES | ZTEC, INC. | M | (913)555-4532 |
| 624 | 0002 | JENNIFER | THOMPSON | AIRMEN, INC. | F | (707)555-5309 |
| 626 | 0003 | MICHELLE | WINTERS | BICKEL, INC. | F | (212)555-2432 |
| | . | . | . | . | . | . |
| 628 | 1434 | Larry | FORMAN | MJC, INC. | M | (214)555-3242 |
| 630 | 1435 | JULIO | MARTINEZ | MOJO, INC. | M | (314)555-8987 |

FIG. 6.

METHOD AND SYSTEM FOR OBFUSCATING DATA STRUCTURES BY DETERMINISTIC NATURAL DATA SUBSTITUTION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

Embodiments of the present invention relate to the field of data structure obfuscation. More particularly, but not by way of limitation, embodiments of the present invention provide a new and useful method and system for replacing data values in a data structure with deterministically generated pseudo-random data values mirroring the distribution of data values in the data structure.

BACKGROUND OF THE INVENTION

Many companies maintain databases that include customer or employee information. The information may comprise names, addresses, phone numbers, social security numbers, company names, salaries, and purchase histories. For example, an internet sales company may have a customer database which includes the names, phone numbers, payment methods, and purchase history of customers. In another example, a payroll department may have salary information regarding its employees. Due to the sensitive nature of some of this information, such as payment methods, social security numbers, and salaries, access is typically restricted to a relatively small group within the company.

As is common with software applications, problems may arise that require troubleshooting by computer programmers. When problems occur with software applications that operate on a database having sensitive information, programmers may need to access the sensitive database to troubleshoot the problem. This may lead to sensitive information being viewed by people who do not normally have access to the information. In the payroll example, distribution of salary information may cause internal problems in the company regarding salary discrepancies. In the internet sales example, distribution of payment methods and other personal information such as social security numbers may lead to identity theft. However, to efficiently troubleshoot the malfunctioning software application, programmers need to access the actual data, and, in particular, the actual data distribution (geographic distribution, name distributions, etc. . . . ).

It is known in the art to obfuscate databases though random data substitution, thereby generating a test database. However, random data substitution does not produce an actual data distribution found in natural databases. A method and system are needed to obfuscate at least portions of databases to produce test databases with data distributions that mirror distributions found in actual databases.

BRIEF SUMMARY OF THE INVENTION

Embodiments of the present invention provide a method for obfuscating data through replacement by deterministic natural data substitution. Further, embodiments of the present invention may have several practical applications in the technical arts including, but not limited to, deterministically replacing confidential data with natural-looking data. The data mirrors patterns found in original data in terms of distribution of data, but does not comprise the original confidential data.

In one embodiment, a method is provided for obfuscating data. The method comprises operating on a first data structure whose obfuscation is desired, and creating a data string based on a portion of the first data structure. Based on the data string, a second data structure is deterministically generated from a third data structure and the second data structure replaces the first data structure.

In another embodiment, a method is provided for constructing a test data structure. The method comprises operating on a source data structure having several types of data fields where each of the data fields includes several rows of data, and determining an identifier for each row of data. Next, for each row of data the method generates a data string based on the identifier, maps a portion of the data string to a value in a reference data structure, and populates a test data structure with the mapped value in the reference data structure.

In yet another embodiment, a computer-readable media having computer-usable instructions is provided for performing a method of generating a synthetic data structure. The method comprises first providing a reference data structure and a source data structure, where each data structure has several data field types and each data field type includes rows of data values. Next, the method comprises assigning a weighted value for each row of data values in the source data structure according to a predetermined pattern and deriving a respective data string for each row of data values of the source data structure. For each row of data values in the source data structure, each data value in the rows of data values in the source data structure is mapped to a data value in the rows of data values in the reference data structure based on the weighted value, the respective data string, and the data field type. Finally, the synthetic data structure is populated with the mapped data value of the reference data structure.

Additional features are described in greater detail below.

BRIEF DESCRIPTION OF THE SEVERAL VIEWS OF THE DRAWING

Embodiments of the present invention are described in detail below with reference to the attached drawing figures, which are incorporated in their entirety by reference herein and wherein:

FIG. 6 is an exemplary obfuscated data structure derived from the data structure of FIG. 4;

DETAILED DESCRIPTION OF THE INVENTION

Embodiments of the present invention provide a novel method and system for obfuscating data values in a first data structure by deterministically generating a unique data string for each row of data values in the first data structure, using the data string to map each data value in the row of the first data structure to a data value in a reference data structure, and creating a second data structure based on the mapped data values in the reference data structure. The deterministic method and system enables reproducible results such that a row of data values in a first data structure are correlated to a row of data values in a second data structure for each instance of obfuscation of the first data structure.

Further, the novel method and system illustrated in the various embodiments of the present invention may, in some embodiments, assign weighted values to certain types of data values in the first data structure to create a second data structure that substantially approximates the distribution of data values in the first data structure. Thus, the second data structure appears random, which is useful in testing and troubleshooting software applications that operate on the first data structure.

Embodiments of the present invention will be better understood from the detailed description provided below and from the accompanying drawings of various embodiments of the invention. The detailed description and drawings, however, should not be read to limit the invention to the specific embodiments. Rather, these specifics are provided for explanatory purposes to help the invention to be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring embodiments of the present invention. But an ordinary-skilled artisan would understand that embodiments of the present invention may be practiced without these specific details. Computer systems, servers, workstations, and other machines may be connected to one another across the communications medium including, for example, a network or network of networks. Further, illustrative data structures used to explain various embodiments of the present invention may be, but are not limited to, databases, spreadsheets, and any other apparatus capable of being a storage medium.

Figure 1A:
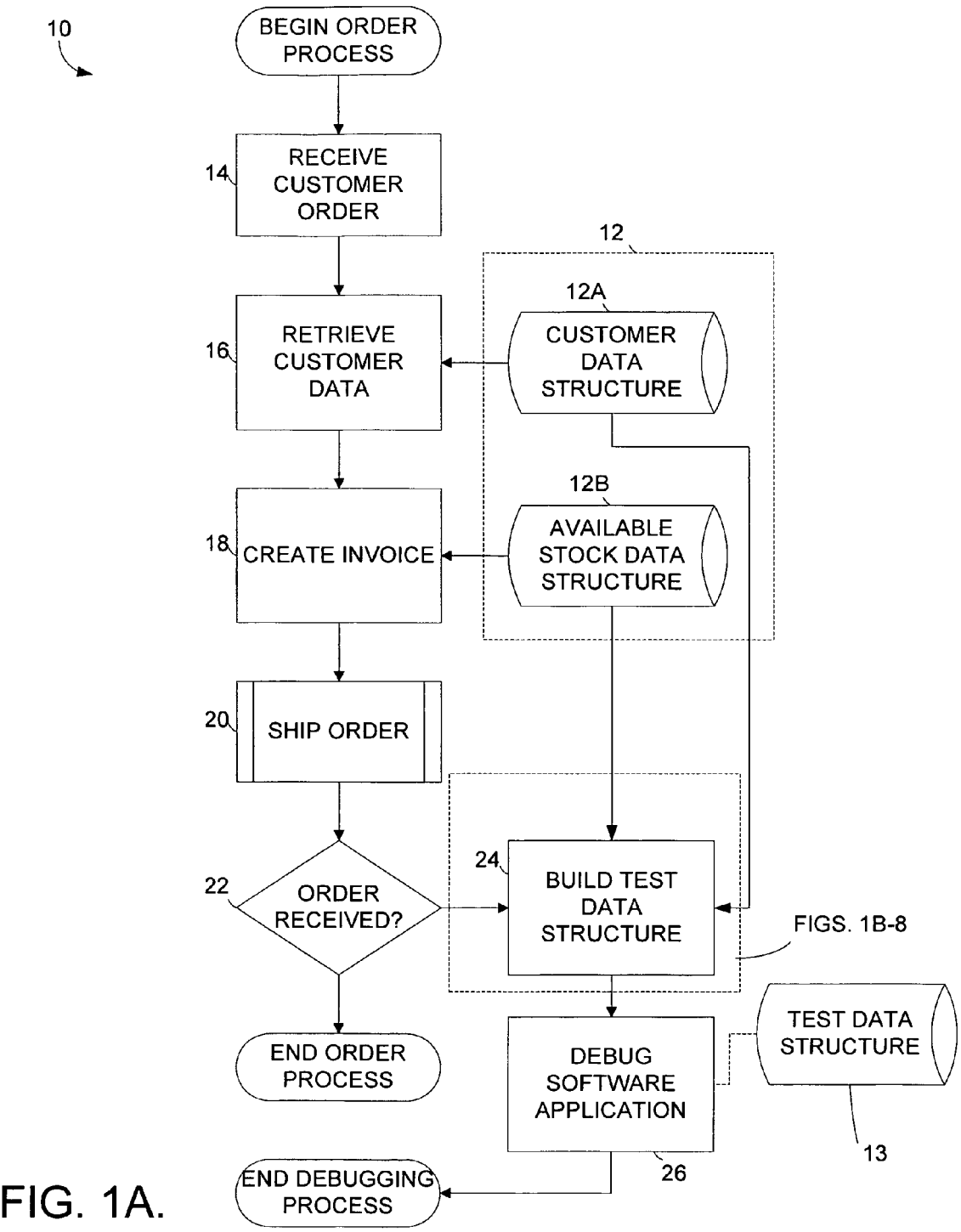
FIG. 1A is a system diagram illustrating an exemplary ordering process.

Turning now to FIG. 1A, there is illustrated a system diagram of a process 10 of an exemplary ordering system using a data obfuscation method illustrated in further detail in FIGS. 1B-8. Process 10 begins at a step 14 where a customer service agent receives a customer order. The order may be received either through an e-commerce website, over the phone, or in person. At a step 16, process 10 retrieves customer data from a data structure 12 which comprises a customer data structure 12A and an stock availability data structure 12B. Customer data structure 12A may include information on the customer such as address, phone, company, social security number, and past payment methods used by the customer. At a step 18, process 10 creates an invoice based on the available stock from stock data structure 12B and shipment information from customer data structure 12A.

The order is shipped to the customer at a step 20 based on the invoice created at step 18. At a step 22, the process is completed if the order is properly received by the customer. However, if the order is not properly received, such as in a situation where the wrong order is shipped or the proper order is shipped to the wrong customer, a software application used by process 10 must be debugged in order to determine the root-cause of the malfunction. At a step 24, a test data structure 13 is created using data values from customer data structure 12A and stock data structure 12B. The software application used by process 10 is analyzed at a step 26 using test data structure 13. It is desirable that the sensitive information included in customer data structure 12A not be distributed outside the limited group of people that require access to the information in data structure 12A. By using a deterministic method to obfuscate the data in data structure 12A, test data structure 13 may be generated with data that appears natural and preserves the confidential information of the customer. Since a deterministic function is used to generate data values in test data structure 13, a data entry in test data structure 13 may be traced back to a data value in data structure 12A to locate the source of the problem in the software application utilized by process 10.

Figure 1B:
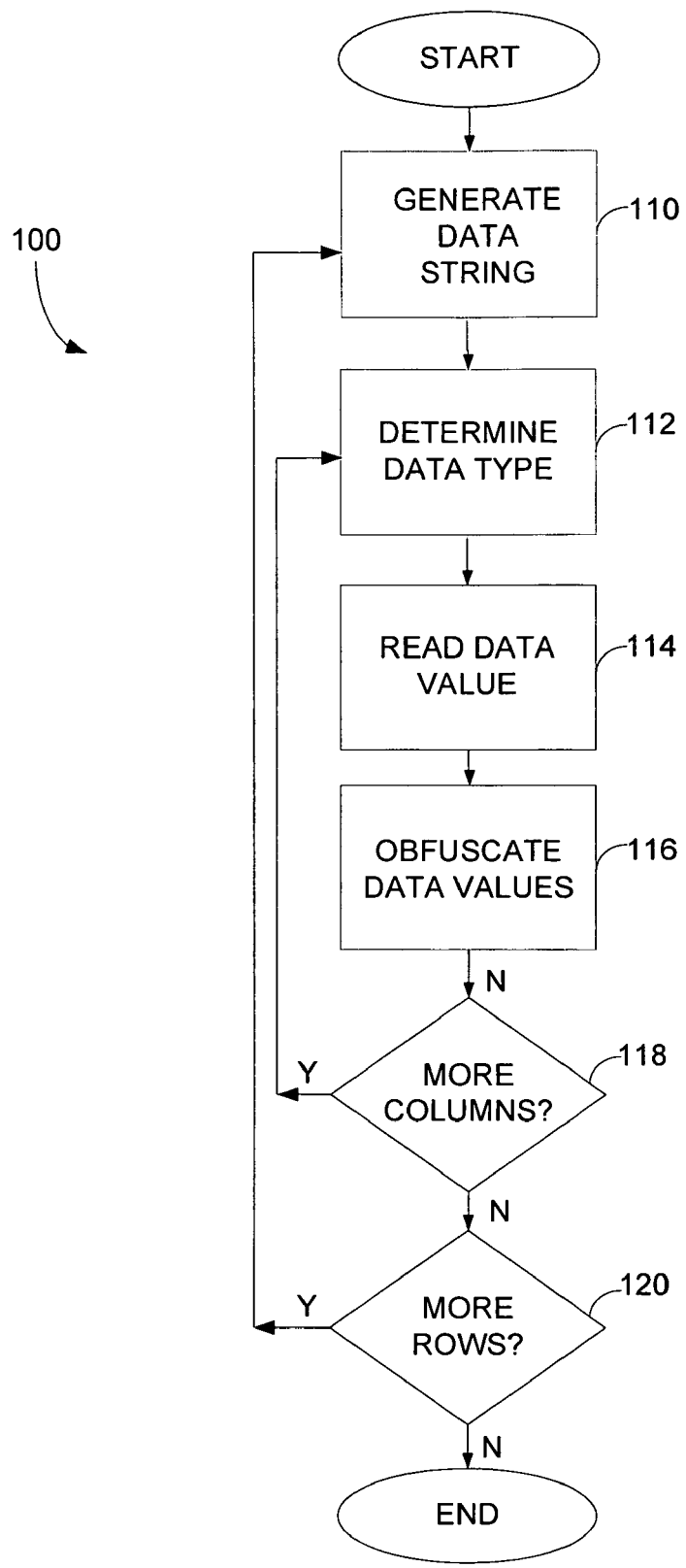
FIG. 1B is a flowchart illustrating an overview of one embodiment of a method for obfuscating a data structure.
Figures 3, 4:
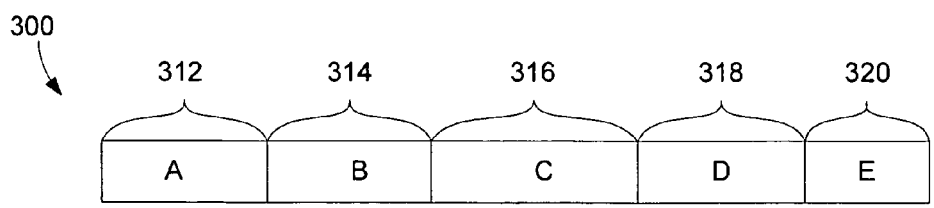
FIG. 3 is an exemplary data string.
FIG. 4 is an exemplary data structure that is desired to be obfuscated.

Turning to FIG. 1B, there is illustrated one embodiment of a method 100 for creating a test or second data structure from a first or source data structure that is desired to be obfuscated. FIG. 4 illustrates an exemplary source data structure 400 having columns 410-420 and rows 422-430. Data structure 400 includes columns of data field types. In exemplary data structure 400, columns are provided to designate ID numbers for each row. Various data field types included in data structure 400 include first names, last names, companies, gender, and phone numbers. Data structure 400, may, in some embodiments, comprise other data field types such as age, and ethnicity.

Returning to FIG. 1B, the obfuscation method 100 includes a step 110 where a data string is generated for a row of the data structure for which obfuscation is desired. For example, row 422 of data structure 400 includes an ID number "0001" that is operated on to generate the data string. The process of generating a data string at step 110 is further discussed in relation to FIG. 2. Continuing with obfuscation method 100, at a step 112 the first data field type, such as an address or name field of the data value in data structure 400, is determined. For example, the data value "Chris" in row 422 is a "first name" data filed type designated by column 412. At a step 114, the data value "Chris" of row 422 and column 412 is retrieved. At a step 116, the data value "Chris" is obfuscated based on the data type and the data string using a third or reference data structure or data structures (not shown) and a corresponding test data structure is created. The test data structure includes the obfuscated data value from the reference data structure corresponding to the data value "Chris". At a step 118, if more columns exist in the data structure that is desired to be obfuscated, such as "last name" column 414, "company" column 418, "gender" column 418, and "phone number" column 420 of data structure 400, then steps 112 through 116 are repeated. After each column has been obfuscated, method 100 moves to the next row at a step 120. For example, row 424 of data structure 400. If more rows exist, a data string is generated at step 110 and method 100 repeats steps 112-118. If, however, no more rows exist in the data structure that is desired to be obfuscated, method 100 is completed. A second or test data structure, such as test data structure 13 in FIG. 1A, has been created, and confidential data in the source data structure has been obfuscated.

Figure 2:
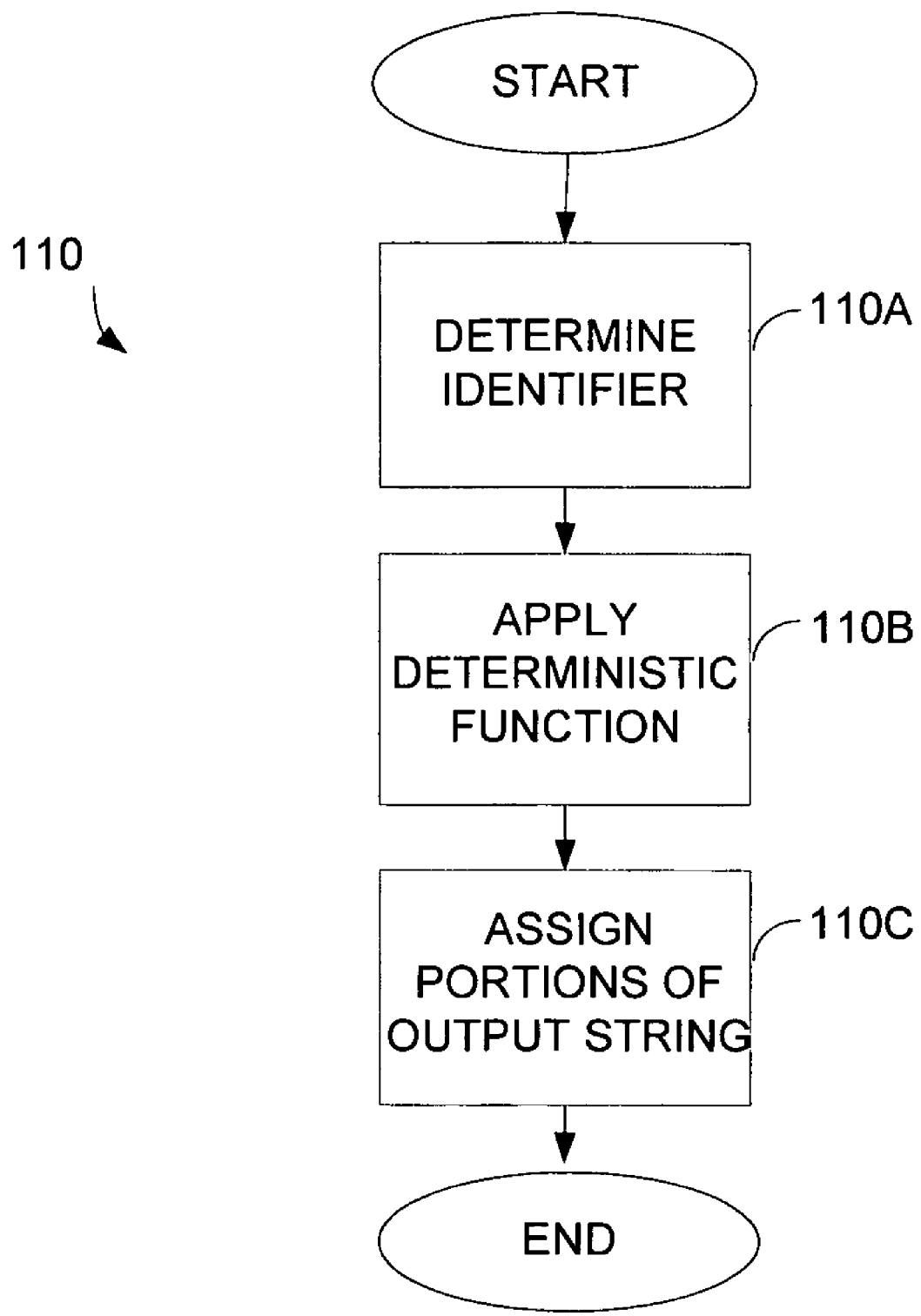
FIG. 2 is a flowchart illustrating in greater detail one embodiment of a process for generating a data string.

Turning now to FIG. 2, there is illustrated in greater detail the process of generating a data string of step 110 of FIG. 1B. The process of step 110 includes a step 10A of determining an identifier of a row of data values in the source data structure. In data structure 400, the "ID" column 410 may be utilized as an identifier. The identifier in row 422 may be "0001". At a step 110B, the identifier is applied to a deterministic function. One examples of deterministic function is an MD-S (message-digest algorithm 5) encryption algorithm. MD-S is a widely-used cryptographic hash function with a 128-bit hash output value. The 128-bit MD-S hashes are typically represented as 32-digit hexadecimal numbers. Using the MD-5 function, even a small change in the input message will result in a completely different output message or hash. The MD-5 algorithm is further described in Internet Engineering Task Force (IETF) Request for Comments (R.F.C.) 1321, which is incorporated herein by reference. The MD-5 deterministic algorithm is used herein for illustrative purposes only. Various embodiments of the present invention may use other deterministic functions, such as, but not limited to, SHA-1 and RIPEMD-160.

Continuing with FIG. 2, at a step 110C, portions of the data string or output of the deterministic function are assigned to data field types in the source data structure. Data structure 400 of FIG. 4 comprises several data field types, namely, "ID" 410, "first name" 412, "last name" 414, "company" 416, "gender" 418, and "phone number" 420. Referring to FIG. 3, there is illustrated an exemplary generic data string 300. Data string 300 comprises five portions matching the five data field types in data structure 400. In one embodiment of step 110C, a portion 312 of data string 300 may be assigned to column 412 of data structure 400 which comprises the "first name" data field types and a portion 314 of data string 300 may be assigned to column 414 which comprises the "last name" data field types. Likewise, portion 316 may be assigned to column 416, portion 318 may be assigned to column 418, and portion 320 may be assigned to column 420 of data structure 400. Although, in this example, portions of data string 300 are assigned in blocks to data field types in data structure 400, in other embodiments of the present invention, portions of data string 300 may be assigned in disconnected groups to various columns of data field types in data structure 400.

Figure 5:
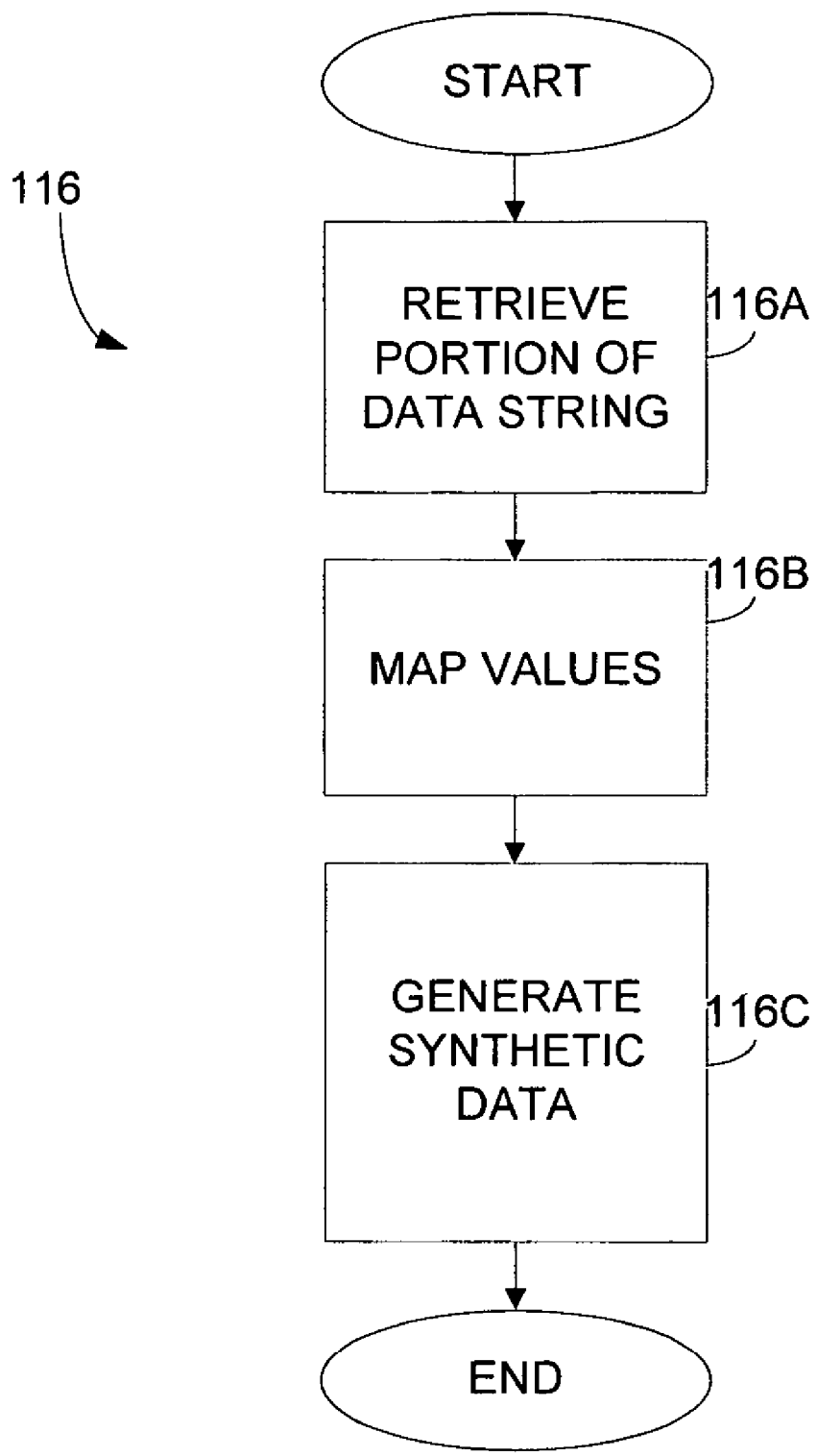
FIG. 5 is a flowchart illustrating in greater detail one embodiment of a process for obfuscating a data structure.

Turning now to FIG. 5, there is illustrated in greater detail the process of obfuscating data values of the source data structure described in step 116 of FIG. 1B. At a step 116A, a portion of the data string that was generated at step 110 in FIG. 1B and explained in further detail in FIG. 2 is retrieved. For purposes of illustration, data string 300 of FIG. 3 is retrieved at step 116A. At a step 116B, a portion of data string 300 corresponding to a data field type in, for example, data structure 400, is mapped to a data value of a corresponding data field type in a reference structure (not shown). The reference data structure may be, for example, census data which includes, among other information, First/Last names, addresses, gender, age, phone numbers, social security numbers, and ethnicity. Further, in other embodiments of the present invention, the reference data structure may be a single data structure or a compilation of data structures, each including data values corresponding to a data field type. At a step 116C, the mapped data value in the reference data structure is retrieved to create a synthetic or test data structure. An exemplary synthetic data structure is illustrated by data structure 600 in FIG. 6. Synthetic data structure 600 comprises the same number of columns and data types as source or obfuscated data structure 400 of FIG. 4 and comprises substantially the same data as in data structure 400 of FIG. 4.

The deterministic function is utilized for each instance a row of data values from a source data structure is mapped to a reference data structure to generate a row of data values in a synthetic data. A reproducible relationship exists between a given row of data values in the source data structure and the corresponding obfuscated row of data values in the synthetic data structure. In other words, with reference to FIGS. 4 and 6, row 422 of FIG. 4 corresponds to row 622 of FIG. 6 for each obfuscation of source data structure 400. As previously mentioned in relation to FIG. 1A, this reproducibility enables multiple instances of debugging the software application used in the order and shipment process without losing the relationship between data values in the customer data structure 12A and test data structure 13.

As previously discussed, a portion of data string 300 of FIG. 3 is utilized to map a value in data structure 400 to a value in a reference data structure (not shown). For example, an age data type may correspond to bits 22-27 of data string 300, and a first name and a last name may be mapped using the least significant 11 bits of data string 300. In an example of choosing first and last names, the most popular 65,000 first and last names in the United States may be downloaded from the Census Bureau. To select one first and last names out of the 65,000 listings in the Census Bureau, a certain number of bits are needed from data string 300. For example, 16 individual bits from data string 300 may be chosen and grouped together for the last name and another 12 bits from the data string 300 may be grouped for the first name. Although 12 and 16 bits are chosen in this example, other bit numbers may be chosen. If, for example, the binary number of the bits for the first name add up to two, the second entry in the reference data structure is chosen. The first name and last name picked from the list of 65,000 are then inserted into the synthetic database structure 500. Similarly, when using an address, a portion of data string 300 may be used to pick an address. For example, if the portion of data string 300 chosen for an address adds up to 192, the 192nd entry in a reference database of addresses is selected and inserted into synthetic data structure 600 of FIG. 6.

Figure 7:
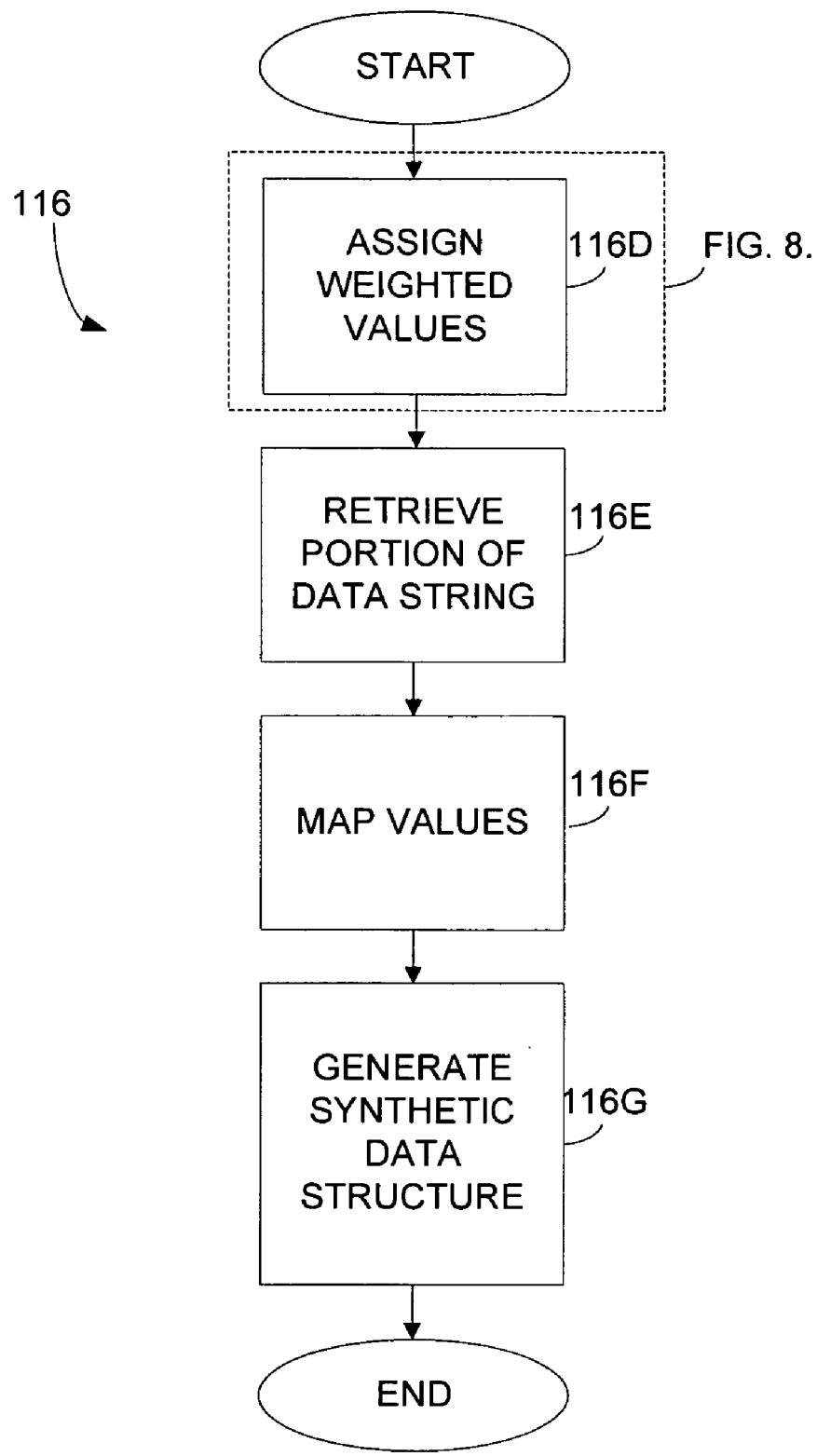
FIG. 7 is a flowchart illustrating in greater detail yet another embodiment of a process for obfuscating a data structure.
Figure 8:
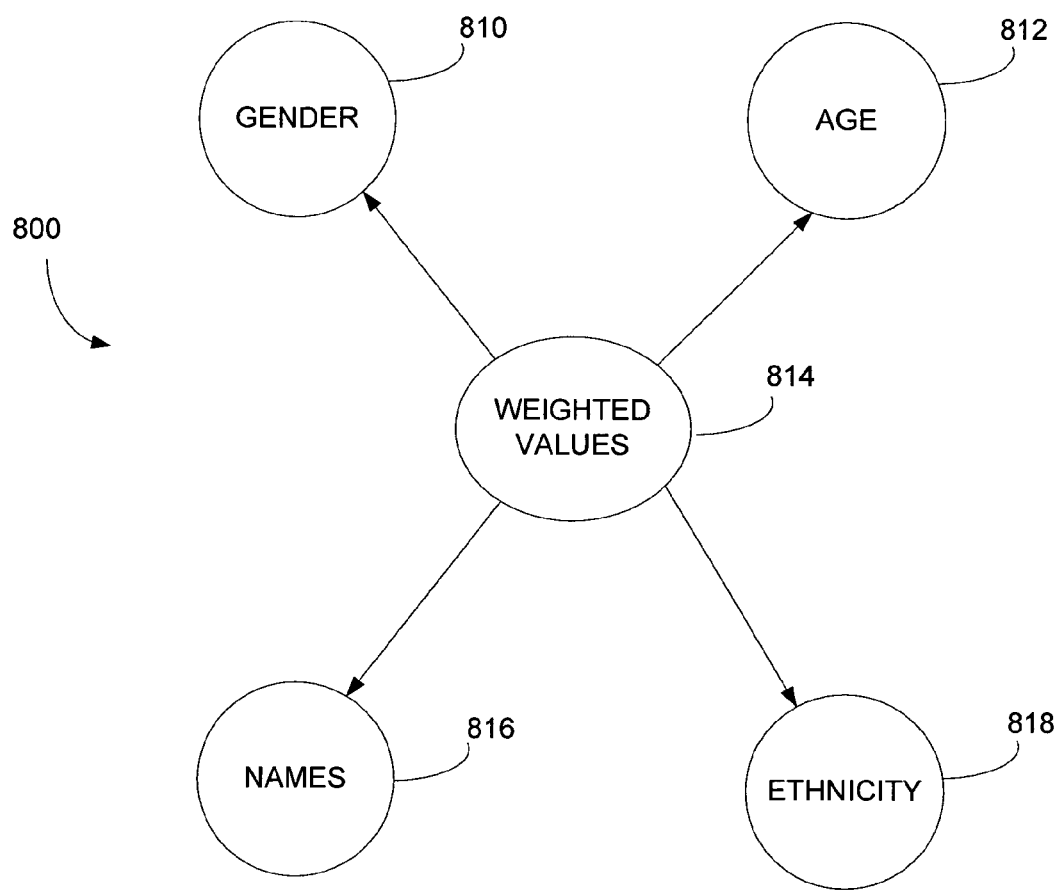
FIG. 8 is a diagram illustrating various data field types to which weighted values may be assigned.

Referring now to FIG. 7, there is illustrated another embodiment for obfuscating data values of the source data structure described in step 116 of FIG. 1B. At a step 116D, a weighted value may be assigned to certain data types. For example, company names beginning with the letter "m" may occur more frequently than companies beginning with the letter "z." A weighting algorithm may be applied in conjunction with the deterministic function to simulate the actual distribution of company names in a population. Referring to FIGS. 4 and 6 in combination, companies that begin with the letter "m" in data structure 400 in the "company" data type field occur more frequently than companies that begin with the letter "z." Likewise, the distribution of companies with names beginning with the letter "m" and companies beginning with the letter "z" is the same or similar in the "company" data type field of data structure 600 of FIG. 6. Similar weighting values may be given, as is illustrated in FIG. 8, for other data field types. Weighted values 814 may be assigned for gender 810, age 812, first and last names 816, and ethnicity 818.

Referring again to FIG. 7, method 116 continues with a step 116E where a portion of the data string 300 is retrieved and mapped to values in a reference data structure at a step 116F. A synthetic data structure is then generated with the mapped values from the reference data structure at a step 116G. Although, in one embodiment, a reference data structure may comprise all data values and data types included in a data structure desired to be obfuscated, other embodiments may comprise several reference data structures, one for each data type included in the data structure desired to be obfuscated.

Certain embodiments of the present invention may utilize weighting algorithms to accurately reproduce data type distributions in a population. The use of weighting algorithms depends on the desired accuracy of the obfuscated data or the accuracy of the distributions in the reference data structure.

The present invention has been described in relation to particular embodiments, which are intended in all respects to be illustrative rather than restrictive. Alternative embodiments will become apparent to those skilled in the art that do not depart from its scope. Many alternative embodiments exist, but are not included because of the nature of this invention. A skilled programmer may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need to be carried out in the specific order described. Not all steps of the aforementioned flow diagrams are necessary steps.

What is claimed is:

1. A computer-readable medium having computer-executable instructions for performing a method of data obfuscation, the method comprising:
    operating on a first data structure whose obfuscation is desired, wherein data obfuscation comprises replacing data values in a data structure with deterministically generated pseudo-random data values mirroring the distribution of data values in the data structure;
    creating a data string based on a portion of said first data structure, wherein said first data structure comprises one or more rows and one or more columns of data values;
    based on said data string, deterministically generating a second data structure from at least one third data structure,
        (1) wherein said second and at least one third data structures comprise one or more rows and one or more columns of data values, and
        (2) wherein each of said one or more columns in said second and at least one third data structure correspond to types of data values in said one or more columns of said first data structure; and
    replacing said first data structure with said second data structure.

2. A computer software product embodied on a computer-readable medium, comprising code for performing a method of data obfuscation, the method comprising:
    operating on a first data structure whose obfuscation is desired, wherein data obfuscation comprises replacing data values in a data structure with deterministically generated pseudo-random data values mirroring the distribution of data values in the data structure;
    creating a data string based on a portion of said first data structure wherein said first data structure comprises one or more rows and one or more columns of data values;
    based on said data string, deterministically generating a second data structure from at least one third data structure,
        (1) wherein said second and at least one third data structures comprise one or more rows and one or more columns of data values, and
        (2) wherein each of said one or more columns in said second and at least one third data structure correspond to types of data values in said one or more columns of said first data structure; and
    replacing said first data structure with said second data structure.

3. The computer-readable medium of claim 1, wherein said first data structure comprises an identifier for each of said one or more rows of data values.

4. The computer-readable medium of claim 3, further comprising generating said data string based on said identifier, said data string being an output of a deterministic function.

5. The computer-readable medium of claim 3, further comprising:
    assigning a weighted value to various types of data values in each of said one or more rows of said first data structure; and
    populating said second data structure with data values from said at least one third data structure based on said assigned weighted values of said first data structure.

6. The computer-readable medium of claim 5, wherein assigning a weighted value further comprises assigning a weighted value according to occurrences in a population of said types of data values in each of said one or more rows of said first data structure such that corresponding data values in said second data structure match patterns naturally found in an actual population.

7. The computer software product of claim 2, wherein said first data structure comprises an identifier for each of said one or more rows of data values.

8. The computer software product of claim 7, further comprising generating said data string based on said identifier, said data string being an output of a deterministic function.

9. The computer software product of claim 7, further comprising:
    assigning a weighted value to various types of data values in each of said one or more rows of said first data structure; and
    populating said second data structure with data values from said at least one third data structure based on said assigned weighted values of said first data structure.

10. The computer software product of claim 9, wherein assigning a weighted value further comprises assigning a weighted value according to occurrences in a population of said types of data values in each of said one or more rows of said first data structure such that corresponding data values in said second data structure match patterns naturally found in an actual population.

* * * * *